United States Patent
Suzuki et al.

(10) Patent No.: US 7,352,098 B2
(45) Date of Patent: Apr. 1, 2008

(54) INSULATOR

(75) Inventors: Katsumi Suzuki, Takahama (JP); Jun Abiko, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/455,189

(22) Filed: Jun. 19, 2006

(65) Prior Publication Data

US 2006/0289198 A1    Dec. 28, 2006

(30) Foreign Application Priority Data

Jun. 23, 2005  (JP) .............. 2005-184072

(51) Int. Cl.
  *H02K 3/34* (2006.01)
(52) U.S. Cl. .................................. 310/215
(58) Field of Classification Search ........... 310/215, 310/216, 43
  See application file for complete search history.

(56) References Cited

U.S. PATENT DOCUMENTS 3,254,372 A * 6/1966 Hofbauer ............... 425/123
4,028,573 A * 6/1977 Terrone ................. 310/217
5,710,473 A * 1/1998 Nobe et al. ............ 310/236

FOREIGN PATENT DOCUMENTS

JP      3288531 B2      3/2002
JP      2003-061287 A   2/2003
JP      2005-12875    * 6/2003

* cited by examiner

*Primary Examiner*—Dang Le
*Assistant Examiner*—Nguyen N. Hanh
(74) *Attorney, Agent, or Firm*—Sughrue Mion, PLLC

(57) ABSTRACT

An insulator includes a main body portion for axially covering one side face of a core that includes a plurality of teeth portions extending in a radial direction, and a plurality of extending portions extending from the main body portion in an axis direction of the core and covering a plurality of slots respectively formed between the teeth portions adjacent to each other. An extending length of one of the extending portions from the main body portion is specified longer than other extending portions.

5 Claims, 3 Drawing Sheets

INSULATOR

CROSS REFERENCE TO RELATED APPLICATIONS

This application is based on and claims priority under 35 U.S.C. § 119 to Japanese Patent Application No. 2005-184072, filed on Jun. 23, 2005, the entire content of which is incorporated herein by reference.

FIELD OF THE INVENTION

This invention generally relates to an insulator. More particularly, this invention pertains to an insulator attached to a core of an electric motor, and the like.

BACKGROUND

Various kinds of insulators attached to a core of an electric motor, and the like, have been proposed. For example, an insulator disclosed in JP2003-61287A is made of insulating resin material and includes a main body portion and multiple extending portions. The main body portion axially covers one side face of a core that includes multiple teeth portions extending in a radial direction. The extending portions extend from the main body portion in parallel with an axis of the core so as to cover multiple slots that are formed respectively between the teeth portions adjacent to each other. A pair of such insulators are attached axially to the core from both sides respectively, for mainly ensuring insulation between the core and a winding wire.

The core of the electric motor, and the like has a complicated structure of multiple teeth portions (or multiple slots), which may cause difficulty in attaching the resin-molded insulator to the core. This is because all of the multiple extending portions that may slightly vary in shape are required to make simultaneously contact with the slots respectively for positioning when the insulator is assembled on the core.

Thus, a need exists for an insulator that can provide improved assembly performance relative to a core.

SUMMARY OF THE INVENTION

According to an aspect of the present invention, an insulator includes a main body portion for axially covering one side face of a core that includes a plurality of teeth portions extending in a radial direction, and a plurality of extending portions extending from the main body portion in an axis direction of the core and covering a plurality of slots respectively formed between the teeth portions adjacent to each other. An extending length of one of the extending portions from the main body portion is specified longer than other extending portions.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 2A:
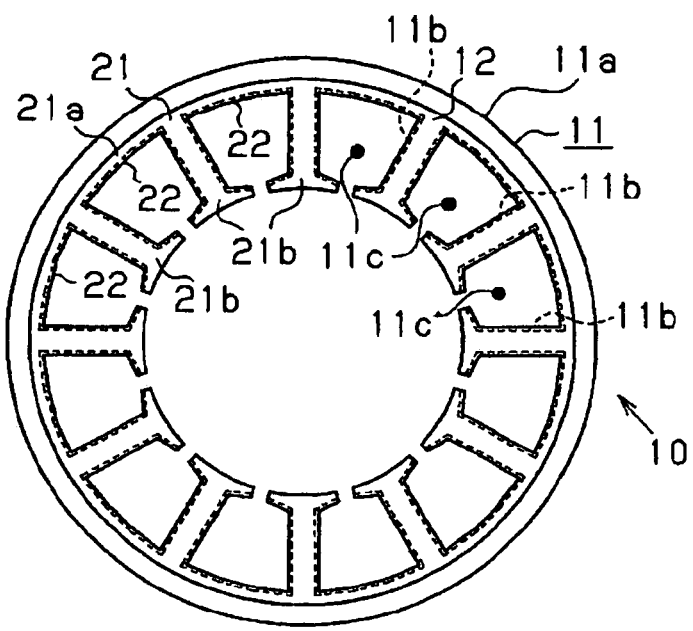
FIG. 2A is a plan view of a stator to which the insulator is applied.
Figure 2B:
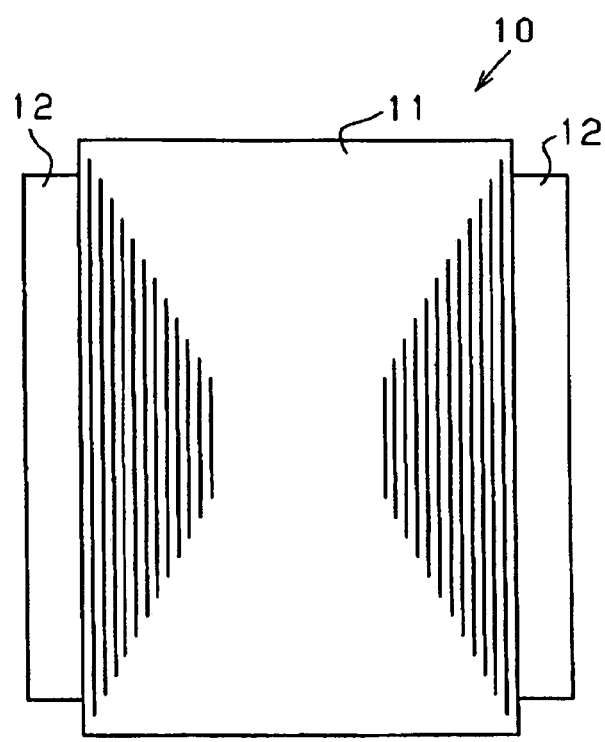
FIG. 2B is a side view of the stator to which the insulator is applied.

An embodiment of the present invention, employed in a stator of a brushless motor, is explained with reference to the attached drawings. FIG. 2A is a plan view drawing and FIG. 2B is a side view drawing respectively, of a stator 10. The stator 10 includes a core 11 and a pair of insulators 12 that are made of insulating material and that are attached to the core 11.

The core 11, which is made of a steel plate lamination layer for example, includes a core main body 11a having a cylindrical shape, and multiple (twelve, for example) teeth portions 11b extending radially in an inward direction from an inner face of the core main body 11a. The multiple teeth portions 11b are integrally connected to each other by means of the core main body 11a and arranged at equal spaces in a circumferential direction. In addition, multiple (twelve, for example) slots 11c are formed respectively between the teeth portions 11b adjacent to each other.

Figure 1A:
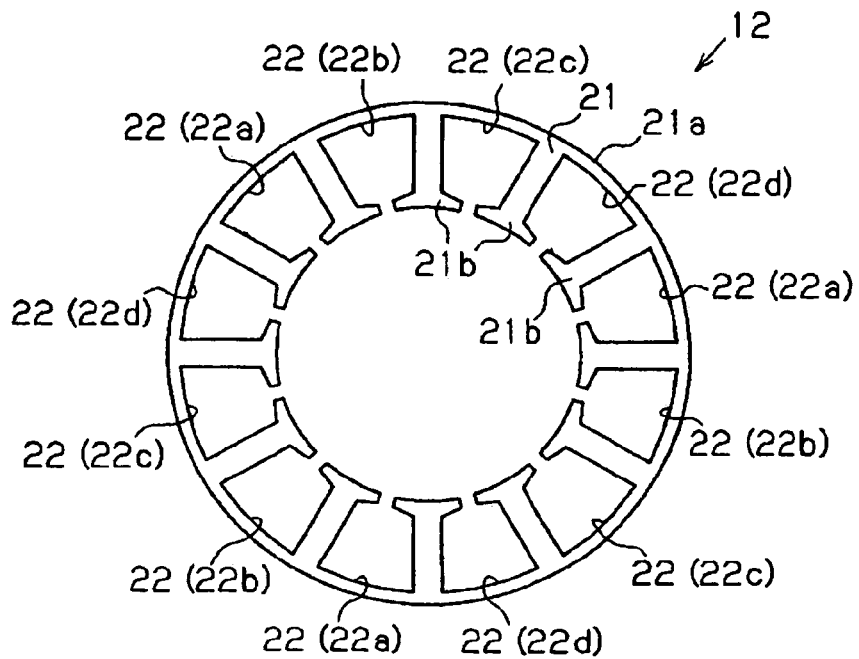
FIG. 1A is a plan view of an insulator according to an embodiment of the present invention.
Figure 1B:
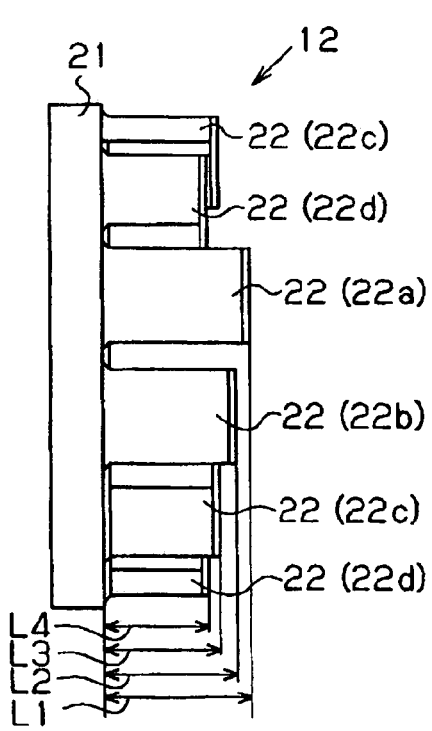
FIG. 1B is a side view of the insulator according to the embodiment of the present invention.
Figure 1C:
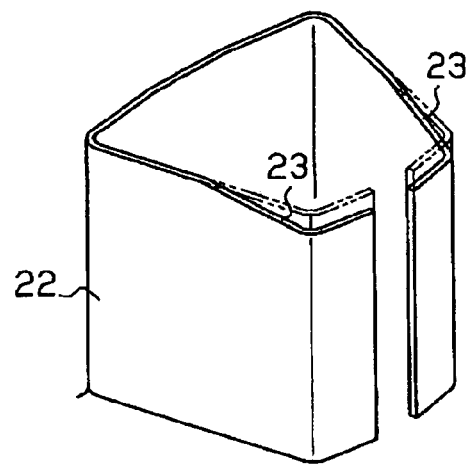
FIG. 1C is a partial perspective view of the insulator according to the embodiment of the present invention.

FIGS. 1A to 1C are a plan view, a side view, and a partial perspective view respectively of each insulator 12. Each insulator 12 is molded by insulating resin material (for example, aromatic nylon). The insulator 12 includes a main body portion 21 and multiple (twelve, for example) extending portions 22 extending from the main body portion 21 in an axis direction of the core 11. In FIG. 1B, only six of the extending portions 22 are shown as the other six of the extending portions 22 are arranged therebehind.

The main body portion 21 integrally includes an annular portion 21a having substantially the same inner diameter as that of the core main body 11a, and multiple projecting portions 21b extending radially in an inward direction from an inner face of the annular portion 21a so as to correspond to the teeth portions 11b. The main body portion 21 covers axially one side face of the core 11.

Each extending portion 22 is molded in a cylindrical shape so as to extend along a wall face of the slot 11c in the axis direction of the core 11. A radial inner side of the extending portion 22 is open across a full length thereof in an axial direction. The multiple extending portions 22 respectively cover corresponding multiple slots 11c.

As shown in FIG. 1B, the multiple extending portions 22 are constituted by four types of extending portions 22a, 22b, 22c, and 22d having different extending lengths from each other from the main body portion 21. Precisely, the extending portions 22a, 22b, 22c, and 22d have extending lengths L1, L2, L3, and L4, (L1>L2>L3>L4) respectively. As a result, the multiple extending portions 22 are divided into groups, each of which is constituted by three extending portions having the same extending length from the main body portion 21 (i.e. three extending portions 22a, three extending portions 22b, three extending portions 22c, and three extending portions 22d). In addition, the extending portions 22 in the same extending length in each group are arranged at equal spaces in a circumferential direction as shown in FIG. 1. The multiple extending portions 22 are formed in such a way that extending lengths thereof are not equal to each other and are different from each other by a predetermined length.

Further, as shown in FIG. 1C, a chamfering portion 23 is formed on an end portion of each extending portion 22 so that the extending length of each extending portion 22 from the main body portion 21 is shorter on an inner circumferential side than an outer circumferential side.

Next, an assembly operation, in case of attaching the insulator 12 to the core 11, is explained with reference to FIGS. 3A to 3D. In FIGS. 3A to 3D, only one of the insulators 12 is only shown in order to simplify explanations. An assembly operation for the other insulators 12 is the same and thus the explanation thereof is omitted.

Figure 3A:
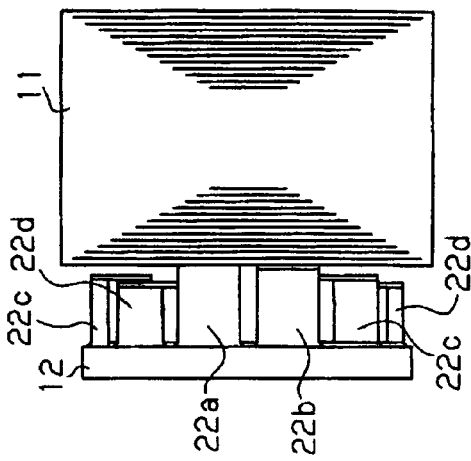
FIGS. 3A to 3D are side views showing assembly operations of the insulator according to the embodiment of the present invention.
Figure 3B:
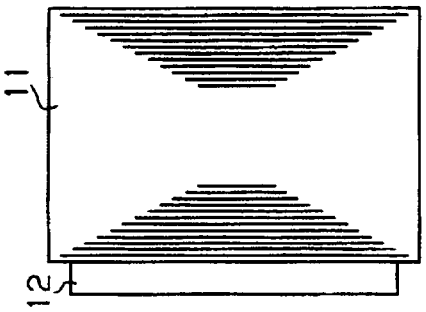

As shown in FIG. 3A, in the cases where the insulator 12 is moved towards the core 11 along the axis of the core 11, first, three extending portions 22a having the longest extending length L1 make contact with the corresponding slots 11c of the core 11 for positioning. Then, when the insulator 12 is further moved towards the core 11 in this state, the extending portions 22a are inserted into the corresponding slots 11c while three extending portions 22b having the second longest extending length L2 are making contact with corresponding slots 11c for positioning as shown in FIG. 3B.

Figure 3C:
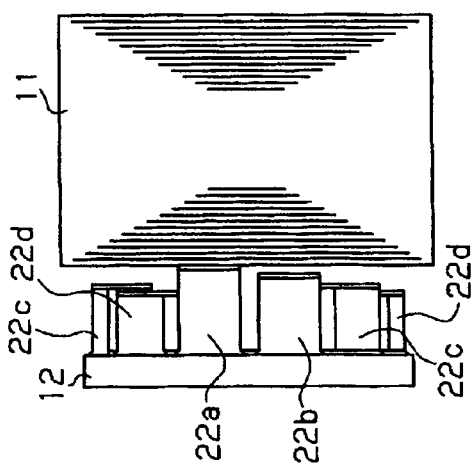
Figure 3D:
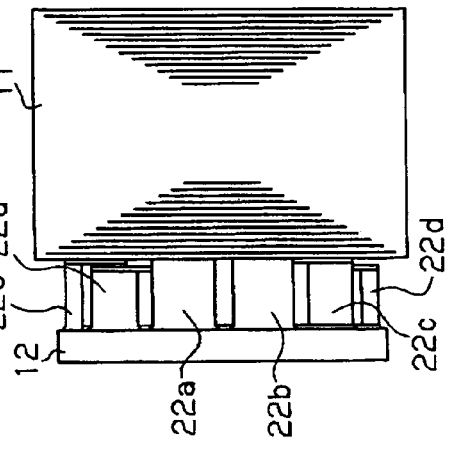

When the insulator 12 is still further moved towards the core 11, in this state, the extending portions 22a and 22b are inserted into the corresponding slots 11c while three extending portions 22c, having the third longest extending length L3, are making contact with the corresponding slots 11c for positioning as shown in FIG. 3C. When the insulator 12 is still further moved towards the core 11, the extending portions 22a to 22c are inserted into the corresponding slots 11c while three extending portions 22d, having the shortest extending length L4, are making contact with the corresponding slots 11c for positioning. Finally, all extending portions 22a to 22d are inserted into the corresponding slots 11c along with the further movement of the insulator 12 towards the core 11, which leads to completion of assembly operation of the insulator 12 relative to the core 11 as shown in FIG. 3D.

According to the aforementioned embodiment, the following effects can be obtained. When the insulator 12 is attached to the core 11, the multiple extending portions 22 (i.e. 22a to 22d, precisely) make sequentially contact with the corresponding slots 11c for positioning in the order of longest to shortest of the extending length from the main body portion 21. Accordingly, all of the extending portions 22 are not required to make simultaneously contact with the corresponding slots 11c for positioning when the insulator 12 is assembled on the core 11. As a result, the assembly performance may be improved.

Further, according to the aforementioned embodiment, the insulator 12 is assembled on the core 11 in such a manner that three extending portions 22a first make contact with the corresponding slots 11c for positioning. In this case, so-called statically determinate condition in a mechanical view is satisfied. The insulator 12 can be assembled on the core 11 in a stable state.

Furthermore, according to the aforementioned embodiment, the number of extending portions 22 is multiples of three (i.e. twelve). Then, the extending portions 22 are divided into groups of; three extending portions 22a, three extending portions 22b, three extending portions 22c, and three extending portions 22d based on the extending length from the main body portion 21. The insulator 12 is attached to the core 11 so that three extending portions 22a, 22b, 22c or 22d, in the same group, make sequentially contact with the corresponding slots 11c for positioning in the order of longest to shortest of the extending length. Accordingly, the insulator 12 can be assembled on the core 11 in the statically-determinated condition in each group.

Furthermore, according to the aforementioned embodiment, the extending portions 22 first make contact with the corresponding slots 11c for positioning at portions where the chamfering portions 23 are not formed (i.e. outer circumferential side). Thus, assembly performance of the insulator 12 relative to the core 11 can be further improved.

The aforementioned embodiment can be modified as follows. That is, the chamfering portions 23 can only be formed on the extending portions 22a, which are first to make contact with the slots 11c.

Further, the number of extending portions 22 (and the slots 11c) may be multiples of three, not limited to twelve. Alternatively, the number of extending portions 22 (and the slots 11c) may be appropriately changed to the number except multiples of three.

Furthermore, the extending portions 22 except three extending portions 22a that first make contact with the slots 11c (i.e. 22a) may have identical extending lengths to each other or have different extending lengths from each other. In this case, it is optional whether the extending portions 22, except three extending portions 22a, can be divided into multiple groups or not.

Furthermore, the number of extending portions 22a that first make contact with the slots 11c may be equal to or more than 1 with the exception of a total number, i.e. twelve. In this case, it is optional whether the multiple extending portions can be divided into multiple groups or not.

Furthermore, the present embodiment may be employed in a rotor of a brushless motor. In this case, a core of the rotor may include multiple teeth portions extending in a radial outward direction, and an insulator may cover slots formed between the teeth portions adjacent to each other in the same way as the aforementioned embodiment.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An insulator comprising:
    a main body portion for axially covering one side face of a core that includes a plurality of teeth portions extending in a radial direction of a stator; and
    a plurality of extending portions extending from the main body portion in an axis direction of the core and covering a plurality of slots respectively formed between the teeth portions adjacent to each other; wherein a quantity of the plurality of extending portions is multiples of three, and at least three different extending lengths are defined for the extending portions extending from the main body portion, wherein the different extending lengths of the extending portions are configured so that the insulator is guided to the core.

2. An insulator according to claim 1, wherein the plurality of extending portions are divided into groups, each of which is constituted by three extending portions having a same extending length from the main body portion.

3. An insulator according to claim 2, wherein end portions of the plurality of extending portions are formed with chamfering portions respectively.

4. An insulator according to claim 1, wherein end portions of the plurality of extending portions are formed with chamfering portions respectively.

5. An insulator according to claim 1, wherein the plurality of extending portions are guiding portions for positioning in an order of longest to shortest of the extending lengths.

* * * * *